United States Patent [19]

Awan et al.

[11] 3,840,437
[45] Oct. 8, 1974

[54] DISTILLATION COLUMN CONTROL METHOD AND SYSTEM

[75] Inventors: Mohemmed M. Awan, Ponca City, Okla.; Albert D. Epperly, Wrentham, Mass.

[73] Assignee: Continental Oil Company, Ponca City, Okla.

[22] Filed: July 17, 1972

[21] Appl. No.: 272,591

[52] U.S. Cl............ 203/2, 202/160, 202/206
[51] Int. Cl............................... B01d 3/42
[58] Field of Search....... 203/1, 2, 3, D18; 202/160, 202/206; 235/151.12; 196/132

[56] References Cited
UNITED STATES PATENTS

| | | | |
|---|---|---|---|
| 3,296,097 | 1/1967 | Lupfer | 203/2 |
| 3,308,040 | 3/1967 | Johnson et al. | 203/3 X |
| 3,354,053 | 11/1967 | Johnson | 203/2 X |
| 3,356,590 | 12/1967 | Johnson | 203/2 X |
| 3,411,308 | 11/1968 | Bellinger | 203/2 X |
| 3,428,528 | 2/1969 | Oglesby, Jr. et al. | 203/2 X |
| 3,619,377 | 11/1971 | Palmer | 203/3 X |

*Primary Examiner*—Jack Sofer
*Attorney, Agent, or Firm*—William J. Miller

[57] ABSTRACT

A multi-component feed stream is separated in a distillation column to provide an overhead distillate product stream and a bottoms product stream. The bottoms product stream flow rate is controlled at a level substantially equal to the computed flow rate based on a material balance determined from measurements of feed flow rate, feed composition and product specifications thereby producing a bottoms product having the desired composition. A signal representative of the predicted internal reflux flow rate is established based on measurements of feed flow rate, feed composition, feed enthalpy and product specifications. The actual internal reflux flow rate is determined and compared with the predicted internal reflux flow rate to obtain a bias signal. The bias signal is used to control the external reflux flow rate at a level such that an overhead distillate product having the desired composition is obtained.

4 Claims, 2 Drawing Figures

------ SIGNALS
———— FLUIDS

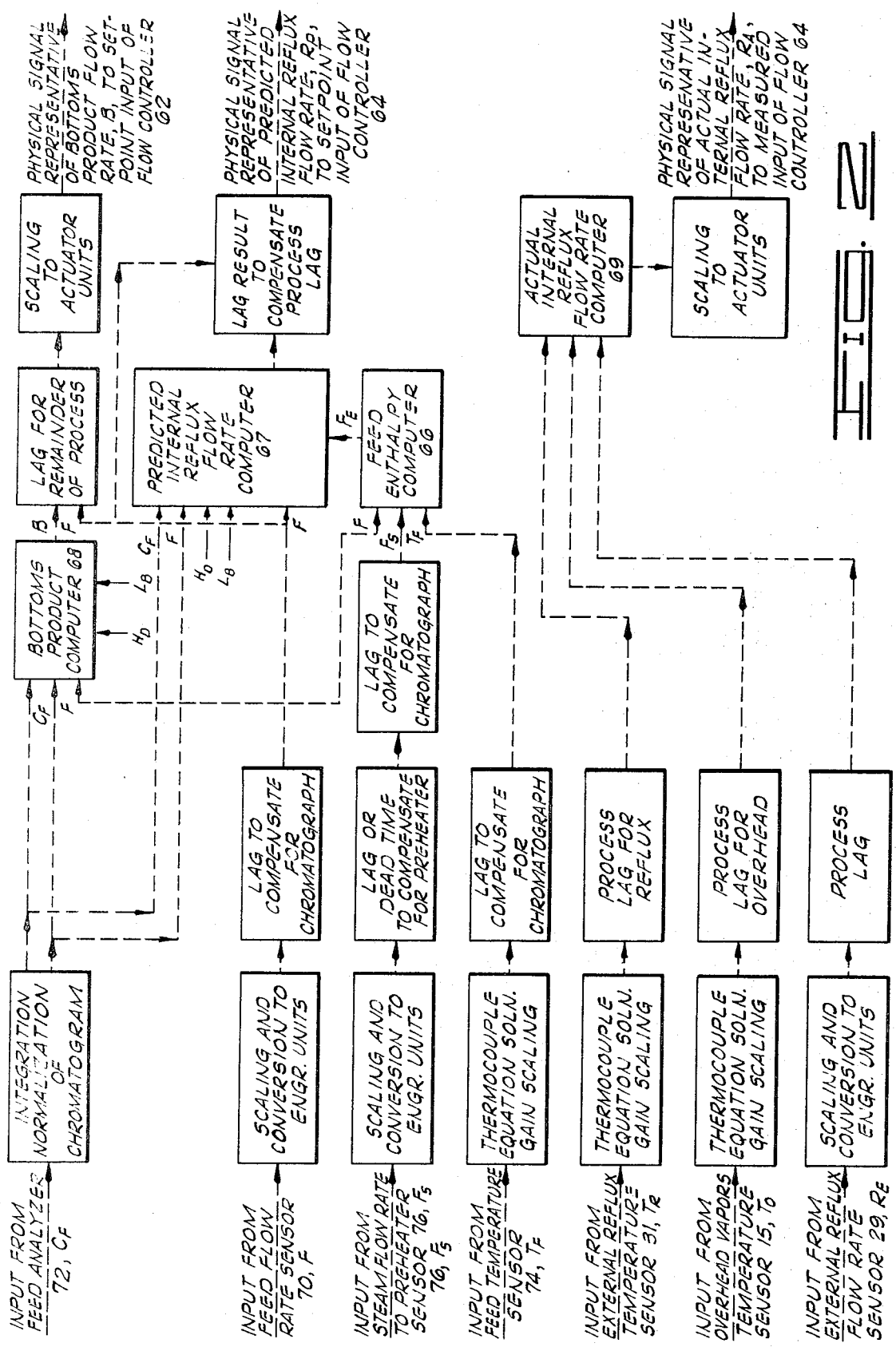

DISTILLATION COLUMN CONTROL METHOD AND SYSTEM

BACKGROUND OF THE INVENTION

1. Field of the Invention

The present invention relates generally to distillation column control methods and systems, and more particularly, but not by way of limitation, to improved methods and systems for predictively controlling a fractional distillation column.

2. Description of the Prior Art

Conventional control systems utilized for controlling fractional distillation columns have generally been of the "feed back" type. That is, the process variables associated with the distillation column which affect the composition of the overhead and bottoms products are changed after changes in product composition are detected. Thus, disturbances or changes in feed stream composition, feed stream flow rate, external reflux temperature or reboiler heat introduce variations in the compositions and flow of the product streams before changes in the operation of the distillation column are made. This variability in product composition necessitates an inefficient operation of the distillation column in order to assure product concentrations substantially equal to the desired concentrations. Generally, distillation columns having such feed back control systems are operated either with an excess of external reflux or reboiler heat or both in order to prevent the production of off-specification products, which operation results in a reduced recovery of products, high utility costs, and inconsistent product composition.

Recently predictive control methods and systems have been developed to achieve more stable and economical distillation column operation. These control systems sense changes or disturbances in feed composition, feed flow rate, etc., prior to when such disturbances affect the operation of the distillation column and make compensating adjustments so that changes in product composition are minimized. While predictive control methods have proved advantageous in various types of process systems, they have generally required elaborate and expensive analyzing, computing and control apparatus to carry out when applied to fractional distillation columns. By the present invention, an improved predictive control method and system for use with distillation columns is provided.

SUMMARY OF THE INVENTION

The present invention relates to a method of controlling the operation of a distillation column system for fractionating a multi-component feed stream containing a light key component and a heavy key component into an overhead distillate product containing a desired concentration of said heavy key component and a bottoms product containing a desired concentration of said light key component, the distillation column system including a heated reboiler, an overhead vapor condenser, an external reflux accumulator and means for returning a stream of external reflux to the distillation column. By the present invention the flow rate and temperature of the multicomponent feed stream is measured and the composition of the feed stream, at least with respect to the concentrations of the light and heavy key components, is measured. The enthalpy of the feed stream is determined based on the measurements of feed stream flow rate and temperature, and the required bottoms product flow rate is determined for a bottoms product containing the desired concentration of light key component from a material balance computation based on the desired light and heavy key component concentrations in the bottom and overhead products respectively, and the measurements of feed stream flow rate and composition. The actual bottoms product flow rate is controlled at a level substantially equal to the determined required flow rate so that the bottoms product obtained contains the desired concentration of light key component. The pressure of the distillation column is controlled at a substantially constant level, and the predicted internal reflux flow rate required for producing an overhead distillate product containing the desired concentration of heavy key component is determined based on the desired light and heavy key component concentrations in the bottom and overhead products respectively, the measurements of feed flow rate and the composition of the feed stream and the enthalpy of the feed stream. The actual internal reflux flow rate is controlled at a level substantially equal to the predicted internal reflux flow rate so that the overhead distillate product obtained contains the desired concentration of heavy key component. Systems for carrying out the method of the present invention are also provided.

It is, therefore, an object of the present invention to provide an improved method and system for controlling the operation of a distillation column.

A further object of the present invention is the provision of an improved method and system for controlling the operation of a distillation column used for fractionating a multi-component feed stream into overhead distillate and bottoms products wherein relatively inexpensive control apparatus may be utilized in conjunction with conventional pressure, temperature and flow control devices.

Other and further objects, features and advantages of the present invention will be apparent from the disclosure of the invention given herein including the drawings and appended claims.

BRIEF DESCRIPTION OF THE DRAWINGS

FIG. 2 is a schematic representation of the information flow within the computer of FIG. 1 which makes the feed enthalpy, bottoms product flow rate and predicted internal reflux flow computations.

DESCRIPTION OF THE PREFERRED EMBODIMENTS

Figure 1:
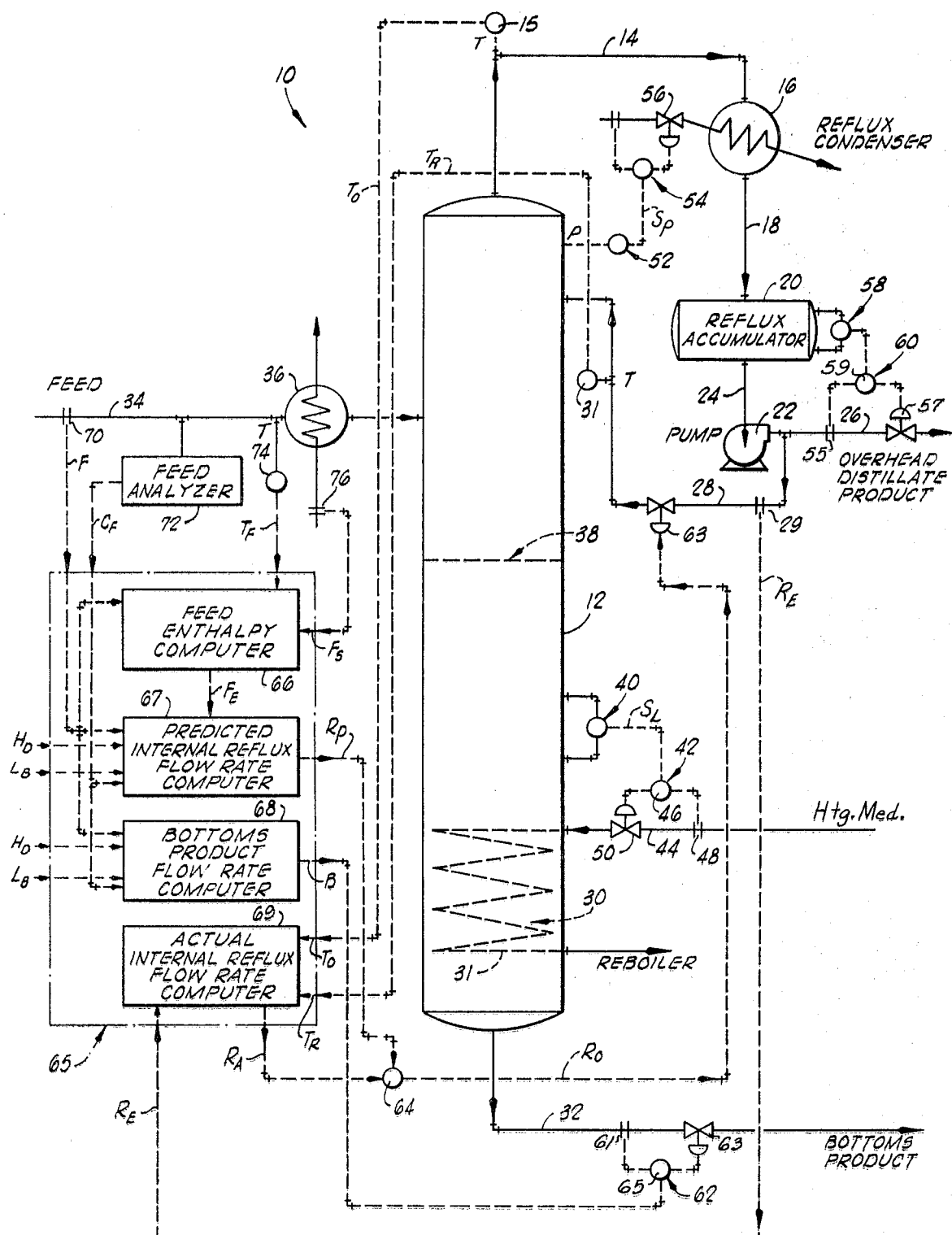
FIG. 1 illustrates in diagrammatic form a distillation column system embodying a control system for carrying out the improved control method of the present invention.

Referring to the drawings and particularly to FIG. 1, a conventional distillation column system is shown, generally designated by the numeral 10. The distillation column system 10 basically comprises a vapor-liquid contact column or tower 12 which is provided with a plurality of vertically spaced liquid-vapor contact trays (not shown). A conduit 14 for conducting overhead vapors from the tower 12 is provided connected to an overhead vapor condenser 16. The condenser 16 is connected by a conduit 18 to a reflux accumulator 20. The liquid discharge of the reflux accumulator 20 is connected to the suction of a conventional pump 22 by a conduit 24, and the discharge of the pump 22 is connected by a conduit 26 to overhead distillate product storage facilities or to further processing facilities. A portion of the overhead distillate product discharged by the pump 22 is conducted by a conduit 28 connected to the conduit 26 to the top portion of the tower 12 as external reflux. A conventional heated reboiler 30, illustrated in FIG. 1 in the form of a steam coil 31 disposed in the bottom of the tower 12, is provided for supplying heat to the distillation column system 10. A conduit 32 is provided connected to the bottom portion of the tower 12 for removing a stream of bottoms product therefrom and conducting it to a storage facility or to facilities for further processing. A multi-component feed stream containing a light key component and a heavy key component is conducted to the distillation column system 10 by way of a conduit 34. A preheater 36 may be provided connected into the conduit 34 for preheating the feed stream prior to its introduction into the tower 12. The feed stream is introduced into the tower 12 by the conduit 34 onto a feed tray 38 located at an intermediate level therein.

The terms "light key component" and "heavy key component" are used herein to designate two of the feed components contained in the multi-component feed stream. The light and heavy key components are those components specified in the overhead distillate and bottoms product streams in advance. In addition, it is customary to consider the light and heavy key components as the components of the feed stream between which the distillation cut is made. The light key component is more volatile than the heavy key component, but since perfect separation is impossible, some of the heavy key component appears as an impurity in the overhead distillate product stream and some of the light key component appears as an impurity in the bottoms product stream. Generally, the operation of a distillation column is specified by designating the overhead distillate product as having a desired concentration of the heavy key component and the bottoms product as having a desired concentration of the light key component. Of course, most of the light key component as well as other lighter components contained in the feed stream are contained in the overhead distillate product stream and most of the heavy key component and other heavy components are contained in the bottoms product stream.

Generally, in the operation of distillation column systems the feed stream composition, feed stream flow rate and feed stream heat content are uncontrolled variables. In accordance with the present invention the variables of such systems which are controlled are:

1. The heat input to the system via the heated reboiler,
2. The pressure level at which the system is operated,
3. The flow rate of bottoms product withdrawn from the system, and
4. The flow rate and temperature of the external reflux stream. An operations control computer, generally designated by the numeral 65, which will be described in detail hereinbelow is provided for controlling the variables mentioned above.

The heat input to system 10 is controlled in direct proportion to the level of liquid within the tower 12. That is, a conventional liquid level control assembly 40 senses the liquid level within the tower 12 and generates a physical signal varying directly therewith which is received by a conventional heating medium flow control assembly 42. The flow control assembly 42 controls the flow rate of the heating medium, e.g., steam, which passes through the heating coil 31 of the reboiler 30. More specifically, the flow control assembly 42 includes a conventional flow control instrument 46 which receives a physical signal in direct proportion to the actual heating medium flow rate from a flow rate sensing device 48. The instrument 46 in turn operates a control valve 50 in accordance with a comparison of the actual flow rate represented by the physical signal from the sensing device 48 and the desired flow rate set point. The desired flow rate set point varies in direct proportion to the physical signal generated by the liquid level controller 40. Thus, the liquid level and flow control assemblies 40 and 42 function in combination to increase or decrease the flow rate of heating medium and resultant heat input to the system 10 in proportion to the rise and fall respectively in the liquid level within the tower 12 thereby maintaining the liquid level substantially constant.

The operating pressure of the system 10 is maintained at a substantially constant level by means of a conventional pressure controller 52 and a conventional flow control assembly 54 which function in combination to increase or decrease the external reflux temperature via the flow of cooling medium passing through the reflux condenser 16 in proportion to increases or decreases respectively in pressure. That is, the pressure controller 52 senses the pressure within the tower 12 and generates a physical signal varying directly therewith which is received by the flow control assembly 54. The flow control assembly 54 operates a cooling medium flow rate control valve 56 in accordance with a comparison of the measured flow rate and the desired flow rate set point. The desired flow rate set point varies in direct proportion to the measured pressure. Thus, as the pressure within the tower 12 increases or decreases the flow of cooling medium to the condenser 16 is increased or decreased respectively thereby correspondingly decreasing or increasing the temperature of external reflux introduced to the tower 12 which in turn has the respective effect of decreasing or increasing the pressure level within the tower 12.

The overhead distillate condensed in condenser 16 passes by way of conduit 18 into reflux accumulator 20. The liquid within the accumulator 20 is controlled at a substantially constant level by a conventional liquid level control assembly 58 in combination with a conventional overhead product flow control assembly 60. The assembly 60 includes a flow sensing device 55 and a flow control valve 57, both disposed in the conduit 26, and a flow controller 59. That is, the liquid level control assembly 58 and flow control assembly 60 function to increase or decrease the flow rate of overhead product withdrawn from the accumulator 20 by way of the conduit 24, the pump 22 and the conduit 26 in accordance with the falling or rising of the liquid level within the accumulator 20.

The flow rate of bottoms product withdrawn from the tower 12 by way of the conduit 32 is manipulated by a conventional flow control assembly 62 which includes a flow sensing device 61 and flow control valve 63, both disposed in the conduit 32, and a flow controller 65. The desired flow rate set point of the assembly 62 is responsive to and varies directly with a physical signal B which represents the flow rate of bottoms product required to meet bottoms product specifications, which physical signal B is generated by a bottoms flow rate computer 68. The flow rate of external reflux conducted to the tower 12 by way of the conduit 28 is manipulated by a conventional flow control instrument 64 in combination with a control valve 63 disposed in the conduit 28. The desired flow rate set point of the controller 64 is responsive to and varies directly with a physical signal $R_P$ which represents the predicted flow rate of internal reflux required to meet overhead distillate product specifications, which physical signal $R_P$ is generated by the predicted internal reflux flow rate computer 67. A physical signal $R_A$ representative of the actual internal reflux flow rate is generated by the actual internal reflux flow rate computer 69 which is applied to the flow controller 64. The controller 64 compares the physical signals $R_A$ and $R_P$ representing actual and predicted internal reflux flow rates respectively and generates a bias signal which is applied to the external reflux flow control valve 63 to increase or decrease the external reflux flow rate with decrease and increase of the internal reflux flow rate.

As indicated above and illustrated in FIGS. 1 and 2, the computations made by the operations computer 65 to produce physical signals representative of the required bottoms product flow rate, B, the predicted internal reflux flow rate, $R_P$, and the actual internal reflux flow rate, $R_A$, can be broken down into four basic computer functions, i.e., a feed enthalpy computer 66, a predicted internal reflux flow rate computer 67, a bottoms product flow rate computer 68 and an actual internal reflux flow rate computer 69.

The rate of flow of feed passing through the conduit 34 is measured by a conventional flow sensing device 70 which generates a physical signal representative of the feed flow rate. This signal is applied to the feed enthalpy computer 66, the predicted internal reflux flow rate computer 67 and the bottoms product flow rate computer 68. A conventional feed analyzer 72 is provided which generates physical signals representative of the concentration in the feed stream of components of interest, generally the light and heavy key components, which are applied as inputs to the predicted internal reflux flow rate computer 67 and the bottoms product flow rate computer 68. The physical signals established by the analyzer 72 are generically designated by the symbol $C_F$. The temperature of the feed stream is measured by a conventional temperature sensor 74 and a physical signal $T_A$ representative of this measurement is applied to an input of the feed enthalpy computer 66.

If a steam heat exchanger 36 is provided for preheating the feed stream, the flow rate of steam through the preheater is measured by conventional flow sensing device 76. The sensor 76 generates a physical signal $F_S$ representative of the steam flow rate which is applied as an input to the feed enthalpy computer 66.

Physical signals, $H_D$ and $L_B$, representative of the desired concentration of the heavy key component in the overhead distillate product and the desired concentration of the light key component in the bottoms product, respectively, are applied to inputs of the predicted internal reflux flow rate computer 67 as well as to inputs of the bottoms product flow rate computer 68.

The feed enthalpy computer 66 produces a physical output signal, $F_E$, representative of the enthalpy of the feed in accordance with the relationship:

$$F_E = f(F, F_S, T_F)$$

where
$F_E$ = feed enthalpy (btu/pound)
$F$ = feed flow rate (volume/unit rate)
$F_S$ = the flow of steam to the preheater, and
$T_F$ = the temperature of the feed (°F).

As will be understood, physical signals representative of the steam quality and steam temperature are also applied to inputs of the feed enthalpy computer 66. Depending upon the particular arrangement of the distillation column apparatus other variables may be applied to the feed enthalpy computer so that an accurate physical signal representative of the feed enthalpy is computed and applied to the predicted internal reflux flow rate computer 67.

The predicted internal reflux flow rate computer 67 produces a physical output signal, $R_P$, representative of the predicted internal reflux flow rate in accordance with the following relationship:

$$R_P = f(F, C_F, E, S_T, F_E, H_D, L_B)$$

wherein
$R_P$ = predicted internal reflux flow rate (volume/unit time)

$F$ = feed flow rate (volume/unit rate)
$C_F$ = composition of the feed stream
$E$ = average column tray efficiency
$F_T$ = feed tray location
$F_E$ = feed enthalpy (btu/pound)
$H_D$ = specified liquid volume fraction of heavy key component in distillate product
$L_B$ = specified liquid volume fraction of light key component in bottoms product
The $R_P$ physical output signal representative of the predicted internal reflux flow rate is transmitted to the setpoint input of the flow controller 64.

Bottoms product computer 68 produces a physical output signal, B, representative of the bottoms product flow rate in accordance with the following material balance relationship:

$$B = f(F, C_F, H_D, L_B)$$

wherein
B = the flow rate of bottoms product required based on a material balance wherein the bottoms product contains the desired concentration of light key component (volume/unit time)
$F$ = feed flow rate (volume/unit rate)
$C_F$ = concentrations of light and heavy key components in feed stream
$H_D$ = specified liquid volume fraction of heavy key component in overhead distillate product
$L_B$ = specified liquid volume fraction of light key component in bottoms product
The output signal, B, is applied to the setpoint input of flow controller assembly 62 which controls the actual bottoms product flow rate at a level substantially equal to the predicted flow rate, B.

The temperature of the overhead vapors exiting the tower 12 by way of the conduit 14 is measured by a conventional temperature sensing device 15 which produces a physical signal representative thereof, $T_0$, which signal is applied as an input of the actual internal reflux flow rate computer 69. The flow rate of external reflux passing through the conduit 28 is measured by a conventional flow sensing device 29 which generates a physical signal $R_E$ representative of the external reflux flow rate. The signal $R_E$ is applied as an input of the computer 69. The temperature of the external reflux passing through the conduit 28 is measured by a conventional temperature sensing device 31 and a physical signal, $T_R$, representative of the reflux temperature is generated and applied as an input of the computer 69. Computer 69 establishes a physical output signal, $R_A$, representative of the actual internal reflux flow rate in accordance with the relationship:

$R_A = R_E [1 + k (T_O - T_R)]$ where $R_A$ = computed actual internal reflux flow rate (volume/unit time)

$R_E$ = measured external reflux flow rate (volume/unit time)

$k = C_P/$ where $C_P$ = specific heat of external reflux or liquid on top tray (btu/unit volume/°F), = heat of vaporization of liquid on top tray (btu/unit volume)

$T_O$ = temperature of overhead vapor or liquid on top tray (°F)

$T_R$ = temperature of external reflux (°F) The signal, $R_A$, is applied to the measurement input of flow controller 64.

The flow controller 64 compares the signal $R_A$ with the signal $R_P$ to produce a bias output signal $R_O$ which is applied to the external reflux flow control valve 63. As will be understood, the flow controller 64 manipulates the control valve 63 to increase or decrease the flow rate of external reflux to maintain the actual internal reflux flow rate at a level substantially equal to the predicted internal reflux flow rate and to maintain the composition of the overhead distillate product at the desired composition.

Referring now to FIG. 2, the information flow within the computer 65 of FIG. 1 is shown schematically. The scaling and conversion of the various physical signal inputs to engineering units is accomplished in a conventional manner. Appropriate lag or delay times are introduced to the various signals so that the output control signals $R_P$, $R_A$ and B are properly timed to effect the required process control. If sufficient lag or delay time information is available relating to the specific distillation column system to be controlled, the information may be placed in the computer as constants which are functions of the input variables such as feed flow rate and feed composition. Where sufficient information relating to the particular lag times required is not available, the lag times may be introduced to the computer 64 as manual input variables.

The bottoms product flow rate computation is based on a material balance developed from the feed composition, flow rate and product specifications. Thus, by controlling the bottoms product flow rate at the required level for producing the desired bottoms product concentration and controlling the heat input to the distillation column system so that a constant level of liquid is maintained within the bottom portion of the tower 12, the desired composition of bottoms product is obtained. As will be understood by those skilled in the art, once the desired bottoms product is produced, and provided the operating pressure of the system 10 is maintained at a substantially constant level, the internal reflux flow rate may be utilized as a control variable for producing an overhead distillate product of the desired composition. By the present invention, the actual internal reflux flow rate is computed, compared with the computed predicted internal reflux flow rate and the external reflux flow rate manipulated so that the actual internal reflux flow rate is maintained substantially equal to the predicted internal reflux flow rate. This improved method of controlling the operation of a distillation column brings about a minimum in product composition changes when disturbances in feed stream conditions are experienced with a minimum of control equipment investment being required.

While the invention has been described in terms of specific control and computing elements, other types of equipment may be employed. The conventional liquid level, flow, temperature and pressure sensing and control devices used may be electrical, mechanical or pneumatic or combinations thereof.

What is claimed is:

1. A method of controlling the operation of a distillation column for fractionating a multi-component feed stream containing a light key component and a heavy key component into an overhead distillate product containing a desired concentration of said heavy key component and a bottoms product containing a desired concentration of said light key component, said distillation column including a heated reboiler, an overhead vapor condenser, an external reflux accumulator, and means for returning a stream of external reflux to said column comprising the steps of:

a. measuring the flow rate and temperature of said multi-component feed stream;

b. producing signals F and $T_F$ varying directly with said measurements of feed flow rate and temperature, respectively;

c. combining said signals F and $T_F$ in a feed enthalpy computer to produce a feed enthalpy signal $F_E$ based on the following relationship:

$F_E = f(F, T_F)$;

d. analyzing said feed stream at least with respect to the concentrations of said light and heavy key components contained therein and producing a signal $C_F$ generically representative of the concentrations of said light and heavy key components;

e. combining said signals F and $C_F$ with constant signals $L_B$ and $H_D$ which are representative of the desired concentrations of light and heavy key components in said bottoms and overhead products respectively in a bottoms product computer to produce a signal B representative of the required bottoms product flow rate based on the following relationship:

$B = f(F, C_F, H_D, L_B)$;

f. adjusting the actual bottoms product flow rate with the signal B so that a bottoms product is obtained containing the desired concentration of said light key component;

g. measuring the pressure of said distillation column and producing a signal $S_P$ in direct proportion therewith;

h. adjusting the cooling of said stream of external reflux with said signal produced in step (g) thereby maintaining the pressure of said distillation column at a substantially constant level;

i. combining said signals F, $C_F$, $L_B$, $H_D$ and $F_E$ in a predicted internal reflux flow rate computer to produce a signal $R_P$ representative of the predicted internal reflux flow rate based on the following relationship:

$R_P = f(F, C_F, F_E, H_D, L_B)$;

j. measuring the temperature of the overhead vapors exiting said distillation column and producing a signal $T_O$ in direct proportion therewith;

k. measuring the temperature and flow rate of said stream of external reflux and producing signals $T_R$ and $R_E$ in direct proportion therewith respectively;

l. combining said signals $T_O$, $T_R$ and $R_E$ in an actual internal flow rate computer to produce a signal $R_A$ representative of the actual internal flow rate based on the relationship:

$R_A = R_E [1 + \text{constant}(T_O - T_R)]$;

m. comparing said signals $R_P$ and $R_A$ and producing a signal $R_O$ representative of the difference therebetween; and n. manipulating the flow rate of said stream of external reflux responsive to said signal $R_O$ to obtain an overhead distillate product containing a desired concentration of said heavy key component.

2. The method of claim 1 which is further characterized to include the steps of:

sensing the liquid level within said heated reboiler and producing a signal $S_L$ varying directly with the rise and fall thereof; and adjusting the heat input to said reboiler with said signal so that said liquid level is maintained substantially constant.

3. In a distillation column system for fractionating a multi-component feed stream containing a light key component and a heavy key component into an overhead distillate product containing a desired concentration of said heavy key component and a bottoms product containing a desired concentration of said light key component, said distillation column system including a heated reboiler, an overhead vapor condenser, an external reflux accumulator and means for returning a stream of external reflux to said distillation column, the improvement which comprises:

a. means for measuring the flow rate of said multi-component feed stream and establishing a physical signal F directly proportional thereto;

b. means for measuring the temperature of said feed stream and establishing a physical signal $T_F$ directly proportional thereto;

c. means for analyzing said multi-component feed stream and establishing physical signals $C_F$ representative of the concentrations of at least said light and heavy key components contained therein;

d. means responsive to the physical signals $T_F$ and F for determining the enthalpy of said feed stream and establishing a physical signal $F_E$ representative thereof;

e. means responsive to said physical signals F and $C_F$ and to constant physical signals $L_B$ and $H_D$ which are representative of the desired concentrations of key components in the overhead and bottoms products respectively for determining and establishing a physical signal B representative of the required bottoms product flow rate based on the following relationship:

$B = f(F, C_F, H_D, L_B)$;

f. means for adjusting the actual bottoms product flow rate with the signal B;

g. means for measuring the pressure of said distillation column and establishing a physical signal $S_P$ directly proportional thereto;

h. means for increasing or decreasing the cooling of said external reflux stream with increases or decreases in the physical signal established in step (g) so that the pressure of said distillation column is decreased or increased accordingly;

i. means responsive to the physical signals F, $C_F$, $F_E$, $H_D$ and $L_B$ for producing a signal $R_P$ representative of the predicted internal reflux flow rate required to produce an overhead distillate product containing the desired concentration of said heavy key component based on the relationship:

$R_P = f(F, C_F, F_E, H_D, L_B)$;

j. means for measuring the temperature of the overhead vapors exiting said distillation column and establishing a physical signal $T_O$ directly proportional thereto;

k. means for measuring the temperature of said stream of external reflux and establishing a physical signal $T_R$ directly proportional thereto;

l. means for measuring the flow rate of said stream of external reflux and establishing a physical signal $R_E$ directly proportional thereto;

m. means responsive to said physical signals $T_O$, $T_R$ and $R_E$ for producing a physical signal $R_A$ representative of the actual internal reflux flow rate based on the relationship:

$R_A = R_E[1 + \text{constant}(T_O - T_R)]$;

n. means responsive to the physical signals $R_P$ and $R_A$ for establishing a physical signal $R_O$ varying directly with the difference between said signals; and o. means for adjusting the external reflux flow rate with the signal $R_O$ thereby adjusting the actual internal reflux flow rate to a level substantially equal to the predicted internal reflux flow rate.

4. The distillation column system of claim 3 which is further characterized to include:

means for sensing the level of liquid existing within said heated reboiler and establishing a physical signal $S_L$ directly proportional to the rise and fall of said liquid level;

means responsive to said physical signal representative of the rise and fall of said liquid level for increasing or decreasing the heat input to said reboiler thereby decreasing or increasing the liquid level within said reboiler.

* * * * *